(12) United States Patent
Petri

(10) Patent No.: US 6,855,192 B2
(45) Date of Patent: Feb. 15, 2005

(54) RELEASE AGENT FOR BITUMINOUS MATERIAL AND USE THEREOF

(75) Inventor: Clara Petri, Winsen (DE)

(73) Assignee: Schill + Seilacher "Struktol" Aktiengesellschaft (DE)

( * ) Notice: Subject to any disclaimer, the term of this patent is extended or adjusted under 35 U.S.C. 154(b) by 0 days.

(21) Appl. No.: 10/438,467

(22) Filed: May 15, 2003

(65) Prior Publication Data

US 2004/0229981 A1 Nov. 18, 2004

(51) Int. Cl.$^7$ ................................. C09D 5/20
(52) U.S. Cl. ..................... 106/2; 524/60; 524/161; 524/318; 524/553; 524/554; 524/571; 106/2; 134/2; 134/36; 134/39; 134/40; 134/42
(58) Field of Search ............... 106/2; 134/2, 36, 134/39, 40, 42; 524/60, 161, 318, 553, 554, 571

(56) References Cited

U.S. PATENT DOCUMENTS

| | | | |
|---|---|---|---|
| 3,895,035 A | * | 7/1975 | Berg et al. ............... 524/432 |
| 4,073,755 A | * | 2/1978 | Berg et al. ............... 523/334 |
| 4,990,482 A | * | 2/1991 | Nigorikawa et al. ........ 503/209 |
| 5,322,554 A | | 6/1994 | DeLong .................... 106/14.11 |
| 5,494,502 A | | 2/1996 | DeLong ..................... 106/2 |
| 6,506,444 B1 | | 1/2003 | Mahr et al. ................ 427/138 |

FOREIGN PATENT DOCUMENTS

| | | | |
|---|---|---|---|
| DE | 4122963 | 10/1992 | ........... E01C/11/24 |
| DE | 19947442 | 9/1999 | ........... C08L/83/04 |
| DE | 19859191 | 6/2000 | ........... C08G/61/08 |
| EP | 0915135 | 5/1999 | ........... C08L/71/02 |
| EP | 0982382 | 3/2000 | ......... C09D/183/04 |
| EP | 0 994 161 | 4/2000 | ........... C08L/95/00 |
| WO | WO9820075 | 5/1998 | ........... C08L/89/00 |
| WO | WO9832833 | 7/1998 | ............ C11D/7/26 |
| WO | WO9954413 | 10/1999 | ............ C09D/5/08 |

* cited by examiner

Primary Examiner—C. Melissa Koslow
Assistant Examiner—Shalie A. Manlove
(74) Attorney, Agent, or Firm—Hayes Soloway P.C.

(57) ABSTRACT

A release agent for bituminous material is disclosed which comprises a mineral oil-free composition containing an aqueous dispersion of a polyalkenamer, preferably a polyoctenamer. The release agent may additionally contain a dispersing agent and at least one fatty acid ester. The release agent also may be used for the cleaning of surfaces such as motor vehicles, road making machines and environmental surfaces contaminated with bituminous material.

15 Claims, No Drawings

RELEASE AGENT FOR BITUMINOUS MATERIAL AND USE THEREOF

The invention relates to a release agent for bituminous material and to the use thereof.

Quite generally, "bituminous material" is understood to include asphaltic bitumen, asphalts, tars and pitches. Asphaltic bitumen is meltable, high-molecular hydrocarbon mixtures, which are isolated in the gentle processing of petroleum, and the contents soluble in carbon disulfide of the natural asphalts. Asphalts are mixtures of asphaltic bitumen and mineral matter.

Large quantities of bituminous material are needed for road construction purposes. As a rule, they are transported and processed at temperatures of between 60 and 100° C. Because of the stickiness thereof even at such elevated temperatures, truck beds, tools, and those surfaces of road making machines, rollers and the like that come into contact with the bituminous material need to be sprayed with release agents so as to keep such surfaces, tools and machines in good working order and to protect the surfaces from being soiled.

The asphalt mixtures employed in road construction have been increasingly modified in the last few years by the addition of so-called "high performance additives" in order to satisfy special requirements; for instance, polyglycols, styrene-butadiene copolymers, styrene-butadiene-amine copolymers are added to the asphalt mixtures, which will often increase the stickiness of the asphalt mixtures even further.

As an effective release agent, light fuel oil or diesel fuel has been used hitherto for protecting the truck beds in the transportation of bituminous material, in particular of asphalt, and for keeping tools and machines in good working order during the processing of bituminous material, because this mineral oil is readily available everywhere and comparatively cheap. Here, however, the harmful effects on the environment and the health hazardous effects of the mineral oil have so far been ignored just as much as the hazards involved due to its low flash point of between 55 and 60° C. A further substantial drawback of the mineral oil resides in that it demixes asphalt mixtures owing to its high solvency for asphaltic bitumen and markedly reduces the cohesion of the asphalt. Diesel fuel and fuel oil are unsuitable as release agents for the novel special asphalt mixtures which may contain polymer binders, elastomers, rubbers and the like, because they either exhibit an insufficient release effect on such mixtures or have a disintegrative effect.

The object of the invention is therefore to provide an effective release agent for bituminous material which is environmentally friendly and not injurious to health and, moreover, is compatible also with those types of asphalt that contain elastomer or rubber components. In addition, the release agent is to have a flash point higher than that of diesel fuel or fuel oil, and it is to be available at a price as favorable as possible.

This object is achieved in accordance with the invention by a release agent for bituminous material, which is characterized by a mineral oil-free composition containing an aqueous dispersion of a polyalkenamer.

Polyalkenamers, also called polyalkenylenes, are polymers which are obtained by ring-opening polymerization or metathesis polymerization of cycloolefins while retaining the double bond. The best-known polyalkenamers that are generally commercially available are polycyclopentadienes, polypentenamers, polyoctenamers and polynorbornenes. The polyalkenamers are vulcanizable unsaturated elastomers of a rubber nature. For this reason, they are utilized for the modification of rubber mixtures, so as to improve upon the processing properties of rubbers. One known commercial product is the trans-polyoctenamer or "TOR" available under the trademark Vestenamer® and having a molar mass of approx. 60,000 g/mol.

It has now been surprisingly found within the scope of the present invention that an aqueous dispersion of such polyalkenamer is an excellent release agent for bituminous material, in particular for asphaltic bitumen and asphalt, but may also be used for the cleaning of surfaces, tools and machines that are contaminated with bituminous material.

In comparison with the mineral oils used as release agents hitherto, the release agent according to the invention has quite substantial advantages:

it is a very effective release agent not only for classical asphalt mixtures, but also for special asphalt mixtures modified with polymers, elastomers or rubbers, and it does not adversely affect the cohesion of the asphalt mixtures;

it is an excellent cleaning agent for surfaces contaminated with bituminous material;

it has a flash point of between 183 and 185° C.;

the adhesion between the mineral foundation (gravel, stones, sand) used in road construction and the asphalt is not affected by the release agent;

it is nontoxic, non-detrimental to health, non-hazardous to water, phosphate-free, halogen-free, biodegradable and thus ecologically compatible as a whole;

in addition, it is sprayable, readily available in large quantities, and cheap to produce.

Preferably, the polyalkenamer according to the invention is selected from the group of the polycyclopentadienes, polypentenamers, polyoctenamers and polynorbornenes. The employment of polyoctenamers such as TOR, for instance, is particularly preferred.

The release agent according to the invention preferably contains 1–80 wt.-% polyalkenamer or of a mixture of several of the aforementioned polyalkenamers. A polyalkenamer content of 3–15 wt.-% is especially preferred, and one of 3.5 to 5.5 wt.-% is even more advantageous.

Preferably, the release agent additionally contains a dispersing agent to obtain a stable aqueous dispersion of the polyalkenamer. One particularly preferred dispersing agent is sodium dodecylbenzyl-sulfonate. It will, however, be obvious to a person of ordinary skill in the art that any other detergent which is readily available on an industrial scale and is effective as a dispersing or emulsifying agent may be used just as well.

Preferably, the release agent according to the invention additionally contains at least one fatty acid ester of a saturated or unsaturated fatty acid having 16 to 32 carbon atoms. Particularly preferred fatty acid esters are methyl esters and/or ethyl esters of fatty acids isolated from vegetable oils. Methyl esters of fatty acids isolated from rapeseed oil are used to particular advantage.

The fatty acid ester content preferably amounts to 30–90 wt.-% of the total composition, and even more preferably to 40–60 wt.-%.

As already mentioned above, the release agent according to the invention is preferably utilized for the cleaning of surfaces contaminated with bituminous material, in particular for cleaning truck beds, for the cleaning of tools that are used in the processing of the bituminous material in road construction, in mining, and quite generally in building construction and civil engineering, and for the cleaning of road making machines, rollers and the like.

A further aspect of the invention is the use of polyalkenamers as release and cleaning agents, such use being novel and surprising to a person of ordinary skill in the art because the polyalkenamers have, to date, been used only for the modification of rubber mixtures and have been known only in this connection.

One particularly preferred aspect of the invention is the use of polyoctenamers as release agents for bituminous material, in particular for asphaltic bitumen and asphalt.

A further especially important and advantageous aspect of the invention consists in the use of polyoctenamers as cleaning agents for motor vehicles, road making machines and environmental surfaces contaminated with bituminous material, in particular asphaltic bitumen and asphalt.

"Environmental surfaces" are meant to include in particular the surface of the sea, the bottom of the sea, river banks and seashores that have been contaminated with heavy oil, refinery residues and similar petroleum products, for instance due to tanker accidents, collisions of vessels and the like. Environmental surfaces further include port facilities, the surroundings of oil drilling sites, oil terminals, oil rigs, drilling platforms and the like. Contaminated motor vehicles may include not only trucks, but also vessels and aircraft.

One especially preferred composition for the release and cleaning agent according to the invention consists of e.g.

| | |
|---|---|
| fatty acid methyl ester (from rapeseed oil): | 54.3% |
| polyoctenamer: | 4.2% |
| dispersing agent (sodium dodecylbenzyl-sulfonate, 20% aqueous solution): | 29.3% |
| demineralized water: | 12.2%. |
| | 100% |

What is claimed is:

1. A release agent for bituminous material, said agent being a mineral oil-free composition comprising an aqueous dispersion of a polyalkenamer comprising at least one fatty acid ester of a saturated or unsaturated fatty acid having 16–32 C atoms.

2. The release agent according to claim 1, wherein said polyalkenamer is selected from the group consisting of a polycyclopentadiene, a polypentenamer, a polyoctenamer and a polynorbornene.

3. The release agent according to claim 1, wherein said polyalkenamer is a polyoctenamer.

4. The release agent according to claim 1, wherein said polyalkenamer comprises 1–80 wt.-% of the total composition.

5. The release agent according to claim 1, wherein said polyalkenamer comprises 3–15 wt.-% of the total composition.

6. The release agent according to claim 1, wherein said polyalkenamer comprises 3.5–5.5 wt.-% of the total composition.

7. The release agent according to claim 1, wherein said release agent additionally contains a dispersing agent.

8. The release agent of claim 7, wherein said dispersing comprises sodium dodecylbenzyl-sulfonate.

9. The release agent of claim 1, wherein said at least one fatty acid ester comprises a methyl ester and/or an ethyl ester of fatty acids isolated from vegetable oil.

10. The release agent according to claim 1, wherein said fatty acid ester comprises 30–90 wt.-% of the total composition.

11. The release agent according to claim 1, wherein said fatty acid ester comprises 40–60 wt.-% of the total composition.

12. A method of cleaning surfaces contaminated with bituminous material which method comprises using a mineral oil-free composition comprising an aqueous dispersion of a polyalkenamer as a release and cleaning agents, wherein said polvalkenamer comprises at least one fatty acid ester of a saturated or unsaturated fatty acid having 2 16–32 carbon atoms.

13. The method of claim 12, wherein polyalkenamer comprises polyoctenamer.

14. The method of claim 12, wherein said bituminous material comprises asphaltic bitumen or asphalt.

15. The method of claim 12, wherein said surfaces contaminated with said bituminous material are surfaces of motor vehicles, road making machines or environmental surfaces.

* * * * *

UNITED STATES PATENT AND TRADEMARK OFFICE
CERTIFICATE OF CORRECTION

PATENT NO. : 6,855,192 B2
DATED : February 15, 2005
INVENTOR(S) : Petri

It is certified that error appears in the above-identified patent and that said Letters Patent is hereby corrected as shown below:

Column 4,
Line 31, "having 2 16-32" should be -- having 16-32 --.

Signed and Sealed this

Twenty-fourth Day of May, 2005

JON W. DUDAS
*Director of the United States Patent and Trademark Office*